United States Patent [19]

Cojan et al.

[11] Patent Number: 4,647,761

[45] Date of Patent: Mar. 3, 1987

[54] AIRBORNE SYSTEM FOR THE ELECTROOPTICAL DETECTION, LOCATION AND OMNIDIRECTIONAL TRACKING OF A TARGET

[75] Inventors: Yves Cojan; Robert Pressiat, both of Paris, France

[73] Assignee: Thomson CSF, Paris, France

[21] Appl. No.: 741,799

[22] Filed: Jun. 6, 1985

[30] Foreign Application Priority Data

Jun. 6, 1984 [FR] France .................................. 84 08851

[51] Int. Cl.⁴ ............................................. G06F 15/50
[52] U.S. Cl. ................................. 250/203 R; 244/3.16
[58] Field of Search ............... 250/203, 234; 244/3.16, 244/3.17; 350/6.2, 6.3, 500

[56] References Cited

U.S. PATENT DOCUMENTS 4,404,592  9/1983  Pepin et al. ......................... 356/149

Primary Examiner—David C. Nelms
Assistant Examiner—Stephone Allen
Attorney, Agent, or Firm—Cushman, Darby & Cushman

[57] ABSTRACT

An airborne system for the electrooptical detection, location and omnidirectional tracking of a target has an input objective lens carried by a universal joint, whereof one frame is rotated circularly in azimuth and the second frame moves the optic in elevation. An image offsetting optical section integral with the universal joint maintains the image centering through the detection plane, the detector being fixed. The image offsetting optical section is catadioptric and has an input mirror integral with the objective lens, and an output mirror integral with the first frame and which reflects the radiation along the circular rotation axis. The input objective lens focuses the radiation in an image plane located on the optical path between two mirrors, and a second optical objective lens, re-forms the field image in the detection plane.

20 Claims, 7 Drawing Figures

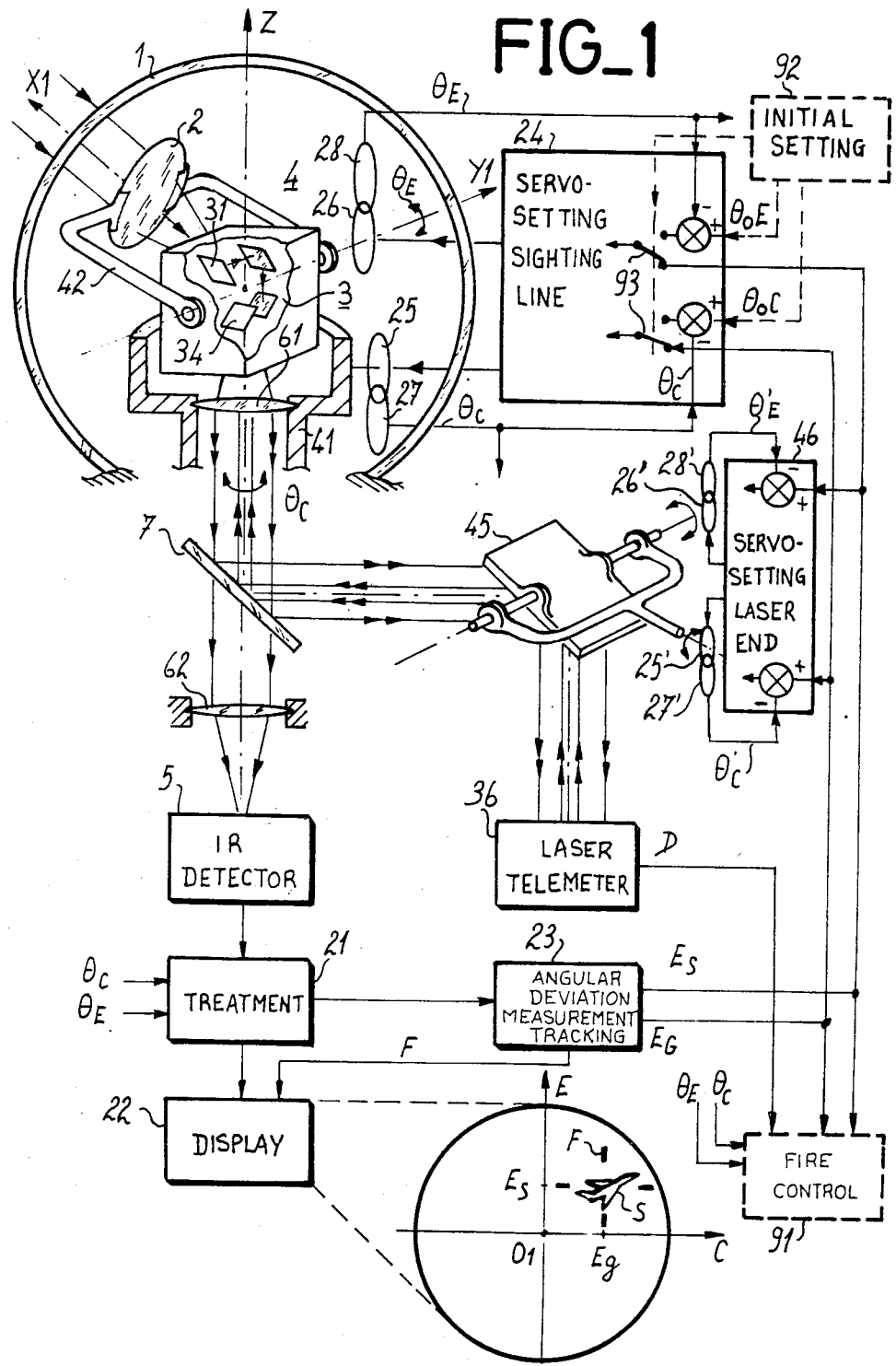

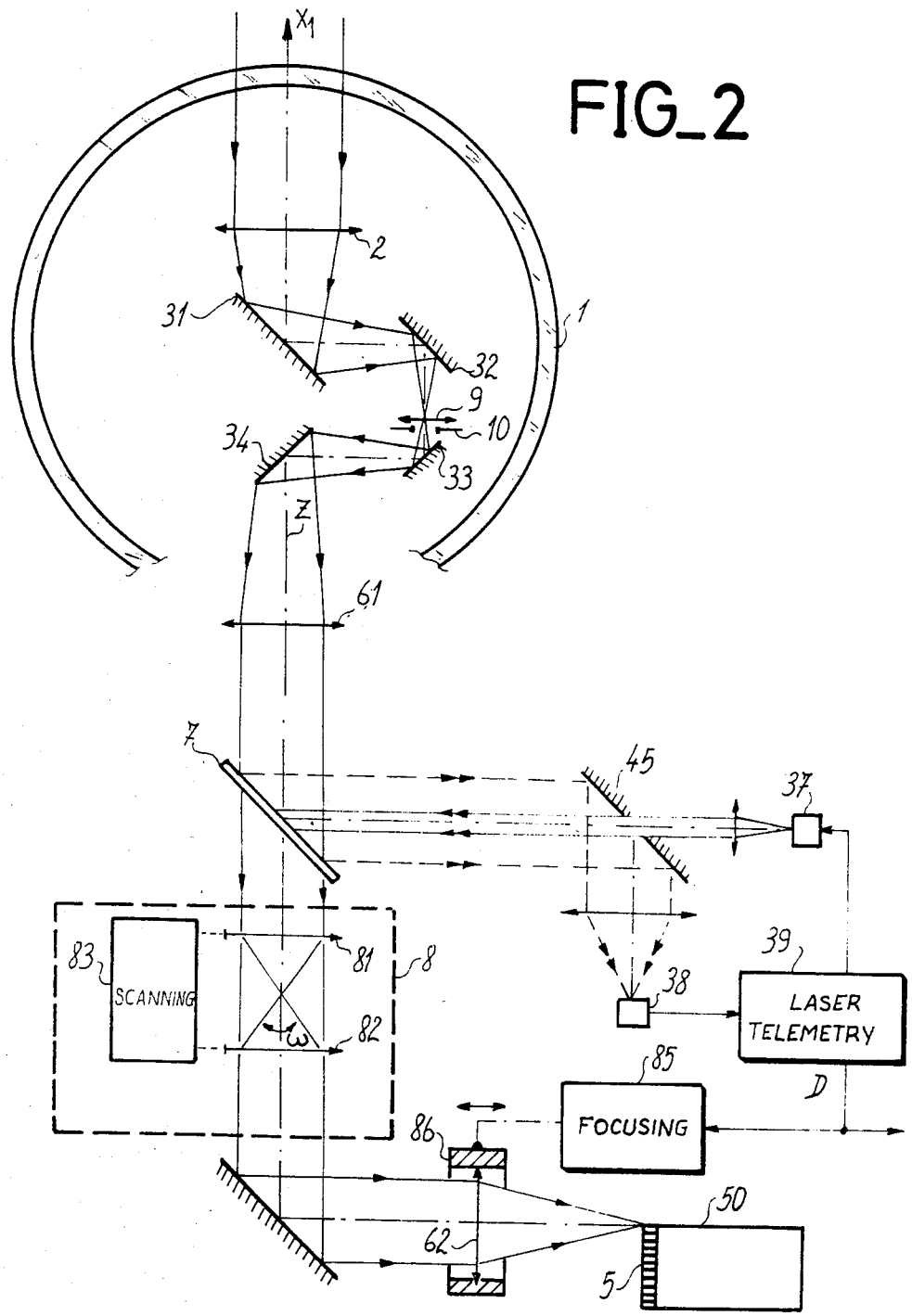

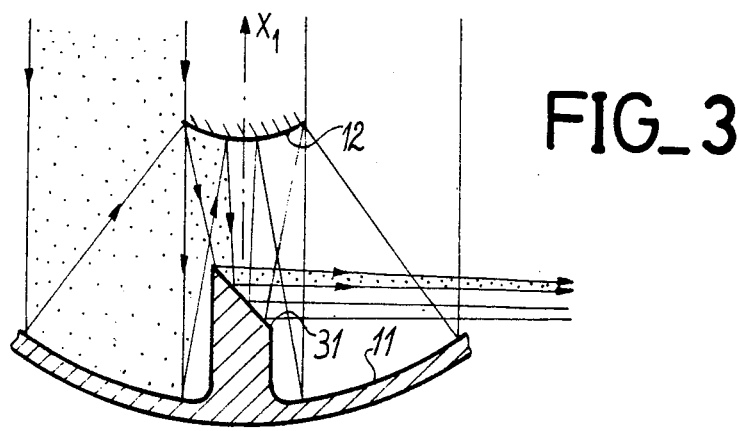
FIG_3
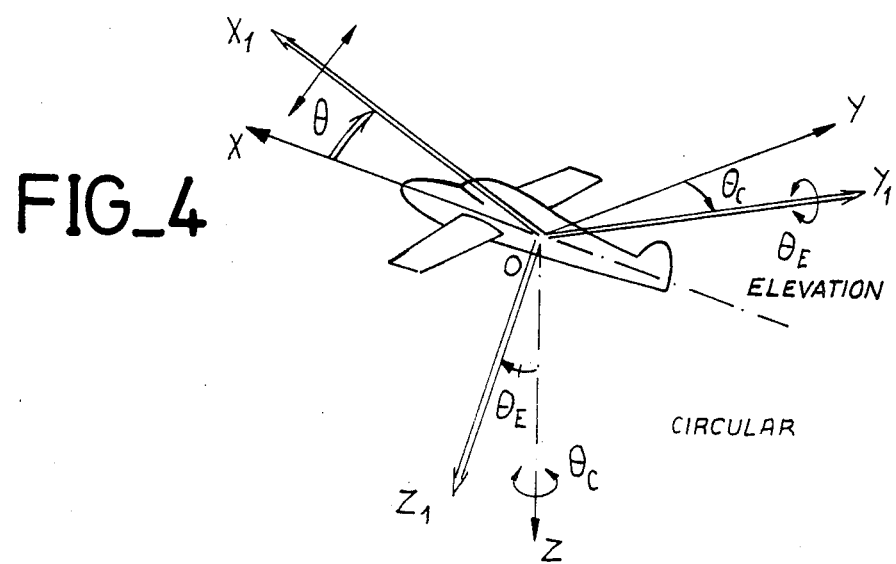
FIG_4
FIG_5
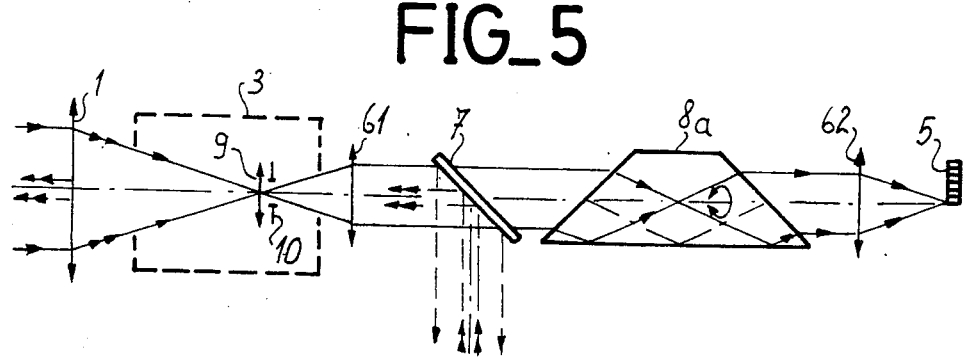

FIG_6
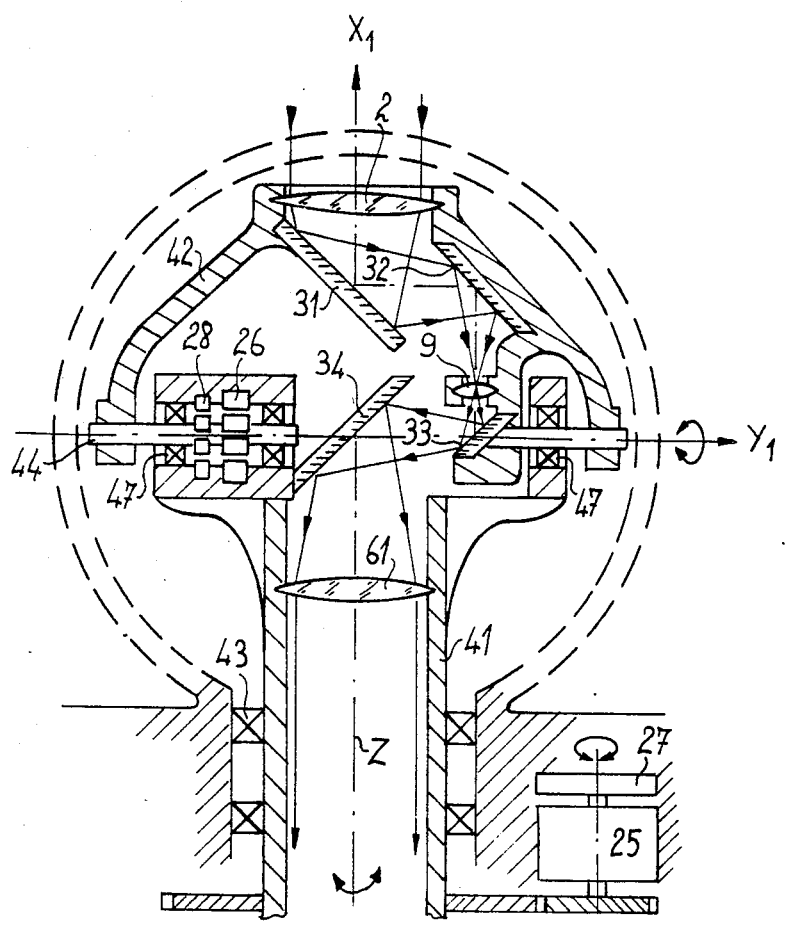

FIG_7
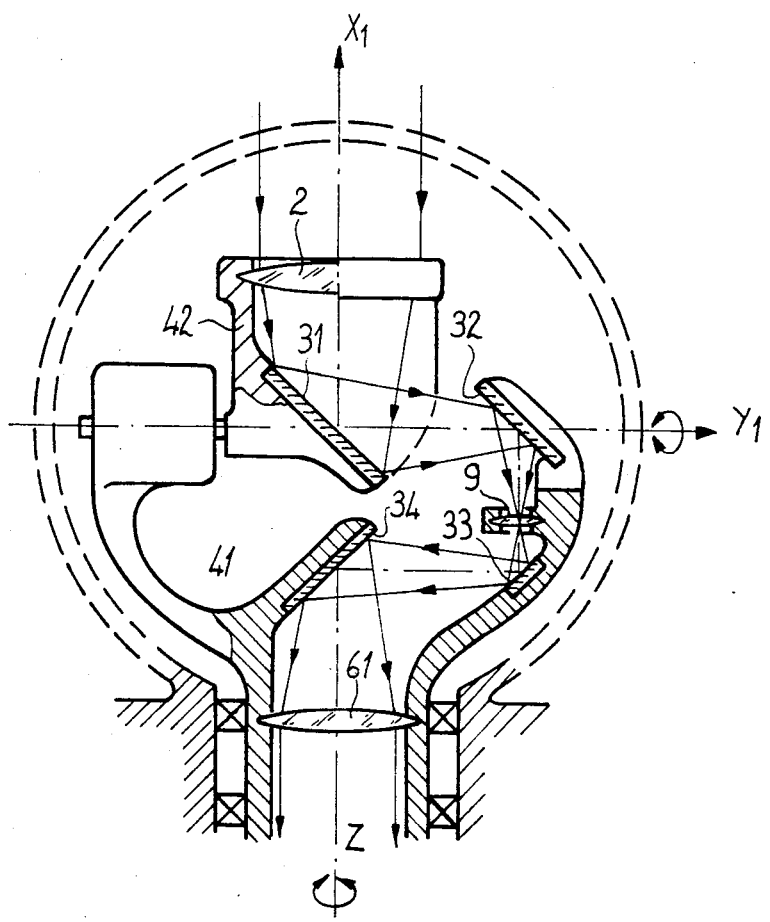

AIRBORNE SYSTEM FOR THE ELECTROOPTICAL DETECTION, LOCATION AND OMNIDIRECTIONAL TRACKING OF A TARGET

BACKGROUND OF THE INVENTION

1. Field of the Invention

The present invention relates to an airborne system for the electrooptical detection, location and omnidirectional tracking of a target. Its use is more particularly envisaged in an air to air system for the interception and combatting of enemy aircraft.

2. Prior Art

The realization of such a system makes use of the structure and procedures used in infrared detection devices provided in homing apparatus. In such equipment, the optics equipment is generally placed on a support which can be oriented circularly (in azimuth) and in elevation by respective rotation about two orthogonal axes. This universal joint-type support makes it possible to angularly displace the optical axis constituting the sighting axis of the device with respect to a reference axis, such as the longitudinal axis of the missile which is integral with the missile body supporting the electrooptical equipment.

U.S. Pat. No. 4,404,592 discloses a solution making it possible to install a fixed detector on the missile body. According to this solution, image offsetting means make it possible to fix the position of the center of the image in the detector plane in the presence of rotations in azimuth and elevation. These means are formed with the aid of plane reflecting mirrors and prisms or bundles of well-ordered optical fibers. Although this type of image offsetting equipment ensures the stability of the optical axis at the output, it introduces a rotation of the image about the optical axis depending on azimuth and elevation rotation values imparted in accordance with the position of the axes of the orientable system. To obviate this, the device is equipped with optical or electronic compensating means performing the necessary correction on the basis of rotation values detected by angular sensors. These solutions are subject to limits with regards to the cumulative retaining of certain interesting operational characteristics consisting of a signficant angular displacement in elevation and azimuth without impairing the pupil of the device, which must be as large as possible, and while obtaining low inertia of the orientable system.

The object of the present invention is to provide a system which can be integrated into an aircraft, bearing in mind that the orientable optical head must necessarily be located outside the fuselage, and which has very extensive angular location characteristics. Circular (azimuth) location must be possible for any random direction, i.e. over 360° corresponding to a panoramic observation. A very large field exceeding 90° is covered in elevation. These angular displacements must occur without the pupil being impaired by the mechanical elements of the system which must remain outside the observation field. It is also necessary for the orientable system to have a low inertia in order to permit a fast response and automatic video tracking of the sighted target. Finally, the angular location by infrared detection is completed by a range measurement (distance location) by laser telemetry, in order to transmit complete target location information to an ancillary device, such as a fire control unit.

To summarize these various points, the proposed system uses the aforementioned procedures, while completing and adapting them. Apart from the special design of the optical head, it has an optical separator for distinguishing between a video display receiving channel and a transmission-receiving channel for laser telemetry. In automatic tracking, the video processing of the display channel makes it possible to measure small variations in the location of the cited target and to produce the corresponding variation signals which are used for controlling the sighting direction of the optical head and the laser telemetry device.

SUMMARY OF THE INVENTION

The present invention proposes an electro-optical detection, location and omnidirectional tracking system having an orientable optical system positioned beneath a dome outside the carrying aircraft fuselage in order to produce an image of the observed field in the sensitive plane of the photodetector. The optical system includes an input objective lens carried by an orientable arrangement with two degrees of freedom, and means for rotating the objective lens about two perpendicular mechanical shafts so as to orient the optical sighting axis at a center of rotation, and an image offset optical section for retaining the image in the center of the detection plane. The detector is integral with the aircraft, which also supports the optical system via the orientable arrangement which includes a universal joint having a first circularly (azimuth) oriented frame and a second frame oriented in elevation and supporting the inputs optics. For an overall circular observation exceeding 90° in elevation, the image offset optical section has several deviating mirrors including one input mirror integral with the input objective lens, and one output mirror integral with the second frame. The input objective lens focuses the received radiation into a plane located on the optical path between the two mirrors. The optical system also has, downstream of the offset optical section, a second objective lens system for transferring the field image into the detection plane. According to a preferred embodiment, the second objective lens system has a first lens integral with the second frame and forming an afocal system with the input objective lens in order to reform a parallel beam, and a second lens focusing the light beam. A dichroic mirror is placed between the two lenses making it possible to create a second optical path for the laser telemetry.

According to one embodiment, the system used in the infrared range is equipped with an optical deflection device (preferably a strip) for producing a linear or circular scan at the detector.

BRIEF DESCRIPTION OF THE DRAWINGS

The invention is described in detail hereinafter relative to non-limitative embodiments and the attached drawings which show:

FIG. 1 is a general diagram of a detection, location and tracking system according to the invention;

FIG. 2 is a simplified diagram of the system showing the optical elements;

FIG. 3 is a constructional variant of the input objective lens;

FIG. 4 is the pitch, roll and yaw axis system of the aircraft for the sighting optics.

FIG. 5 is an aligned arrangement of the optical elements;

FIG. 6 is a first embodiment of the orientable optics; and

FIG. 7 is a second embodiment of the orientable optics.

DESCRIPTION OF THE PREFERRED EMBODIMENTS

Referring to FIGS. 1 and 2, the system comprises an orientable optical head, placed beneath a dome 1 outside the aircraft fuselage. The aircraft houses the remaining parts, including the electronic circuitry and detection means.

The orientable optical head comprises an input objective lens 2, and an image offsetting optical section 3 supported by an arrangement 4 with two degrees of freedom. Arrangement 4 is of the universal joint type and is formed by a first frame 41, orientable about a so-called circular axis Z, and a second frame 42 which rotates about a so-called elevation axis Y1 which is perpendicular to the first-mentioned axis. This second frame 42 supports the input objective lens 2 and part of the image offsetting optical section 3. The arrangement 4 makes it possible to orient the optical axis X1, or the sighting axis of the system. The elevation $\theta E$ and azimuth $\theta C$ rotations lead to a rotation about the center O of the universal joint and provide a depointing value $\theta$ relative to a reference axis linked with the support, i.e., the aircraft.

FIG. 4 defines the axes of the equipment. X, Y and Z are the roll, pitch, and yaw axis systems of the aircraft, and X1, Y1 and C1 are integral with the orientable input objective lens 2, the direction X1 representing the sighting axis. In the represented configuration, consideration has been given to a first rotation of a circular nature $\theta C$ about the axis Z and a second elevation rotation $\theta E$ about axis Y1, according to which is obtained the definitive configuration X1, Y1, and Z1. The reference axis X can correspond to the longitudinal axis of the aircraft, as shown.

The image offsetting optical section 3 advantageously includes a catadioptric system grouping four deviating mirrors, including a first mirror 31 at the entrance for reflecting the reception radiation from the input objective lens 2. Thus, mirror 31 is integral with frame 42. In the same way, at the exit, a mirror 34 is fixed to frame 41 and reflects the light beam along the circular rotation axis Z. Embodiments will be described hereinafter relative to FIGS. 6 and 7.

According to the invention, the focal line of objective lens 2 is such that the corresponding image plane is located in the optical path between mirrors 31 and 34 and a second objective lens system is positioned at the exit from the image offsetting optical section 3 in order to re-form the image of the field observed on the sensitive plane of a photodetector 5 (FIG. 1). Thus, a first optical channel is defined, which is more particularly intended for the collection of infrared radiation, e.g. in the 8 to 12 micron band. In order to provide a second optical channel for laser telemetry and to be able to operate in another band, e.g. around 1.06 microns, it is advantageous to design the output objective lens system in the form of two elements, a first lens 61 forming an afocal arrangement with objective lens 2 and a second lens 62 (FIG. 1). Lens 61 re-forms a parallel beam (the infrared radiation coming from a remote target and corresponding to radiation emitted by a source point, and is received by the input objective lens 2 along a parallel beam) and facilitates the installation of a channel separator mirror 7 on the optical path. Mirror 7 is a dichroic mirror, which reflects the radiation of one channel, e.g. that the laser channel, and permits the passage of the other channel, the spectral bands being separate. In the considered embodiment, mirror 7 can be made from germanium. The second lens 62 is used for focusing the beam in the detection plane. Detector 5 is positioned along the Z axis.

In the infrared range, particularly in the 3 to 5 micron and 8 to 12 micron bands, at present there are no suitable matrix detectors or tubes and use is made of a strip detector by passing the field image in front of a linear detection grating with the aid of an optical deflection device. Certain solutions lead to the linear passage of the image in a direction perpendicular to the strip, so that there is a Cartesian scanning at X and Y.

According to other solutions, a circular scan is obtained by rotating the image about a center, the strip being positioned radially from said center. Reference can be made in this connection to U.S. Pat. No. 4,404,592, which describes a cylindrical lens-type solution. A solution of this type is symbolized in FIG. 2 by deflecting device 8 grouping cylindrical lenses 81, 82 and a member 83 for rotating block 8 about axis Z. Another possible solution using a Wollaston prism 8a is shown in FIG. 5. In each of these solutions, the motor member 83 imparts a constant rotation speed to the corresponding optics, said speed being equal to half the rotation value which it is wished to impart on the field image. The image rotation enables all the points of the image to be successively analyzed by detecting strip 5, each photodetector element analyzing the points located at a corresponding distance from the center O1 of the image. The deflecting device 8 producing the field scan is positioned downstream of the channel separator mirror 7, bearing in mind that it must only act on the optical path intended for detector 5. The infrared detector 5 is generally associated with a cooling system 50, the assembly being fixed to the aircraft structure.

The optical system also has additional elements used for the correction and formation of a good quality image on the detector, said additional elements consisting of a collecting lens 9 and a diaphragm 10 located in the image offsetting optical section 3 in the vicinity of the focal plane of the input objective lens 2 (see FIG. 2).

As shown in FIG. 3, the receiving optics may be constructed in accordance with a Cassegrain system with a main concave mirror 11 and a secondary plane or convex mirror 12, the optical reception axis X1 passing through the center O of the universal joint, which forms the instantaneous rotation center of the orientable arrangement 4. The input mirror 31 is joined to the main mirror 11 and to mirror 12 by not shown arms. The Cassegrain optics permits a larger input pupil for equal overall dimensions.

The circuits downstream of detector 5 comprise circuits 21 for the pre-processing of the detected signals in order to supply the processed signal to a cathode display device 22 and to automatic tracking and angular deviation measurement circuits 23. The image of the field observed by objective lens 2 is formed on the cathode ray screen, the central point O1 representing the path of axis X1. An electron window F makes it possible for the operator to point the target S, and the deviations $E_S$ and $E_G$ of the center of said window relative to O1 represent the angular depointing of axis X1 with respect to target S. Deviation signals $E_S$ and $E_G$ are supplied to the position servomechanisms 24 for producing circular and elevation rotations making it possible to recover the direction of the target and ensure automatic tracking. Servomechanism 24 controls rotation motors as indicated in FIG. 6. A circular motor 25 fixed to the aircraft by its stator drives frame 41 about axis Z, while an elevation motor 26 integral with frame 41 by its stator drives the second frame 42. With said motors are coupled angular sensors 27, 28 respectively, e.g. resolvers for measuring the angular position and for forming corresponding control loops during the acquisition phase.

The deviation signals $E_S$ and $E_G$ are also transmitted to an ancillary utilization unit 91, e.g. a fire control unit. The detection and location system cooperates with an initial setting member 92, installed in the aircraft, which supplies the initial pointing data of the sighting axis to a target. Element 92 can consist of a radar, gunsight, etc. installed on the aircraft. This pointing or initial setting corresponds to the aforementioned acquisition phase. The device 92 supplies pointing data $\theta_{oE}$ and $\theta_{oC}$ to the target and these data are compared with those of the optical head position $\theta_E$ and $\theta_C$ supplied by the sensors, to produce corresponding recovery or "making good" data. When this phase is completed, it is possible to pass the recovery data on to the automatic tracking mode and the servomechanism 24 is then supplied directly by the signals $E_S$ and $E_g$ measured at element 23. Switch 93 symbolizes the corresponding mode passage.

In order to also supply the distance information D of target S, the system is equipped with a laser telemetry device 36, which comprises a transmitter 37, e.g. a laser diode, for producing laser pulses in the form of a very fine light pencil beam which is transmitted to the optical head after reflection on dichroic mirror 7. The laser radiation reflected by the target is received by the optical head and is reflected by separator mirror 7, to the corresponding receiver, such as a photosensitive diode 38 (FIG. 2). The field of the receiver corresponds to that of the transmitter and the fields are coaxial. The electronic circuits 39 measure the time lag corresponding to the distance D of target S.

As the laser beam is only very slightly divergent, in order to have a good high energy concentration, the axis of the laser telemetry device 36 must bring about proper sighting of the target. This cannot be brought about with an adequate precision by servocontrol means 24 to 28 of the optical head, said system not having an adequate response speed. It is therefore necessary to provide a rapid deviating means for the laser beam, keeping the latter pointed accurately onto the target. Said means comprises an optical deviator 45 and deviation control circuits 46. Deviator 45 includes a small reflecting mirror orientable according to two perpendicular axes controlled by broad band position servomechanisms 46 for effecting the precise recoveries required on the basis of the deviation signals $E_s$ and $E_G$, measured by circuits 23. These signals are compared with angular position values $\theta'C$ nd $\theta'E$ obtained by angular sensors 27' and 28' using a procedure identical to that of the aforementioned acquisition. The initial setting of the deviator mirror 45 is such that the optical axis of the laser telemetry device 36 corresponds to the central position O1 on the displayed image.

This leads to a very fast, but limited displacement servocontrol, because deviation mirror 45 has a small size and much less inertia than the optical head. Moreover, it is only necessary to correct the servocontrol errors of the optical head. Signals $E_S$ and $E_G$ are only valid in tracking, if the telemetry channel is out of use during the preceding target acquisition by the initial setting of the optical head.

As a result of the limited displacements to be given to mirror 45 for making good the instantaneous depointing of the target, said mirror 45 can have a hole in order to permit the passage of the emission laser beam and also return the received laser beam to the detector diode 38 (FIG. 2).

In the case where Cassegrain-type input optics are used, it is necessary to displace the laser pencil beam so that it falls outside the unused central puil zone as a result of the mask effect of the secondary mirror 12.

FIGS. 6 and 7 show detailed embodiments of a small, low inertia optical head. The afocal system of lenses 2 and 61 makes it possible to have a parallel output beam, a lens 61 whose diameter can be smaller than that of the input objectives lens 2, and a beam within the image offsetting optical system 3 which decreases up to the focal plane where the collecting lens 9 is located and then increases again. Thus, there is a narrow internal beam, which facilitates the installation of intermediate reflecting mirrors 32, 33 making it possible to produce an internal beam with small dimensions. The small mirror 32 at the input reflects the beam perpendicularly in a direction parallel to the elevation axis Y1, then the second mirror 32 reflects the beam parallel to the sighting axis X1 (in the case of FIG. 6) or axis Z (in the case of FIG. 7). The third mirror 33 reflects the beam in direction Y1 and finally the fourth mirror 34 at the output reflects the beam parallel to the fixed direction Z relative to the aircraft. Thus, the narrowest zone of the optical path is located on the lateral portion including mirrors 32 and 24 and collecting lens 9, which facilitates their integration and positioning on frame 42. Diaphragm 10 (FIG. 2) is obtained by mechanical posts, which support the lens 9. In the embodiment according to FIG. 6, the input objective lens 2 and mirrors 32, 33 are integral with the frame 42 with two degrees of freedom. However, in the version of FIG. 7, only lens 2 and mirror 31 are supported by frame 42. Thus, the FIG. 7 version is preferred because it has a much smaller inertia about axis Y1, which makes it possible to obtain servocontrol about Y1 with a higher pass band. It is also possible to have a larger diameter input objective lens than in the case of FIG. 6.

The optical head is driven in circular manner by frame 41, which is terminated on the aircraft side by a tubular body in which is mounted the output lens 61. This tubular body includes the circular rotation axis and is disengaged from the fuselage by ballbearings 43 (FIG. 6). The elevation driving takes place about a mechanical shaft 44, which is also disengaged from frame 42 by roller bearing 47 on corresponding bearing means. A bearing supports the motor torque means 26 and angular sensor 28 which has small dimensions. Connecting wires leading to elements 26 and 28 pass into the internal part of the outlet tube of frame 41 and are not shown.

The transparent dome 1 has the necessary mechanical properties and also an appropriate and perferably spherical shape, for taking account of the aerodynamic forces exerted on the aircraft. It also has adequate optical transmission properties in the operating band used, which is e.g. 0.8 to 13 microns in the present case.

Dome 1 also insulates the optical head from the external environment.

On approaching the target, the displayed image loses its clear definition as a result of defocusing in the detection plane. To obviate this, the system is advantageously completed by a device for focusing the terminal focusing lens 62. This device is symbolized in FIG. 2, and comprises a circuit 85 which receives the distance information from the laser telemetry and processes a control signal making it possible to move a support 86 parallel to the optical axis of lens 62. The displacement and the corresponding control signal can be deduced from the well known optical formula $1/D - 1/D' = 1/f$, D being the target distance given by telemetry device 36, D' the focusing distance for the image and f the focal length of objective lens 62.

The infrared detector 5 may comprise a strip of sensitive elements in the envisaged spectral band coupled to a charge transfer circuit integrated with the strip and permitting the multiplexing of the strip elements. This strip is disposed according to a radius of the instantaneous field in the case of a rotary scanning system 8 associated so as to bring about coincidence between each element of the strip and a corresponding annular field. The sensitivity band of the strip can be between 8 and 12 or between 3 and 5 microns. It is also possible to use two sensitive strips, one in the first of said bands and the other in the second, the strips being disposed in accordance with two different radii, e.g., two opposite radii. This option permits treatment by comparison between detections in the two bands and the extraction of targets on a decoy background. The multiplexing circuit associated with the strip permits preprocessing in the input plane and consequently a simplification of the downstream pre-processing electronics 21 and the cabling, accompanied by an improvement in the reliability.

The detecting strip can be cooled in a per se known manner by the use of a nitrogen and argon gas Joule-Thomson double expansion circuit. The argon permits a fast cooling of the detectors and the nitrogen maintains the temperature at about 80° Kelvin.

The tracking angular deviation measurement circuits, as well as the servocontrol circuits, can be produced in a known manner and are not discussed further.

The detection, location and omnidirectional tracking system described provides the following additional advantages:

pointing an optical axis X1 in a direction designated by another means (pilot, radar, other sighting system), in which direction is located an air target, e.g. an enemy aircraft;

supply an image on the basis of the reception of the infrared radiation of said target (image displayed by a television-type receiver in front of the pilot or specialized observer);

tracking in the direction of the barycenter of said target when this direction evolves;

supplying measurements of the distance of said sighted target by emitting an infrared pencil beam and receiving the radiation reemitted by the target and measuring the transit time.

The spatial field covered by the system differes from those generally used, in that it covers a very large volume with two degrees of freedom for the optical head only. The coverage is total in the circular mode and in elevation can e.g. reach $-30°$ towards low sites with respect to the OX and OY plane of the aircraft, and then up to 120° for high sites with respect to the same plane. The elevation angle above 90° is useful for preventing the loss of target image when the target reaches direction OZ in elevation and then passes beyond it.

The system has numerous variants, and, apart form those referred to hereinbefore, consideration can also be given to the case where detector 5 is of the bidimensional type, e.g. a television image sensor, detection taking place in the visible range. In this case, it is obviously unnecessary to provide a rotating device 8. The means for compensating the rotation of the image resulting from the effect of the image offsetting optical section 3 as a result of rotations imparted in azimuth and in elevation for the optical head are not described in detail, because they are carried out in known manner optically e.g., by acting on the circular field scanning control 8, or electronically by acting on the display and modifying as a consequence thereof the deflection signals of the cathode display device.

A 1.06 to 10.6 micron laser channel could be coupled with a between 3 and 12 micron infrared channel. With TV display in the visible range, a 1.06 micron laser can be coupled.

If the optical head is mounted on parts of the aircraft subject to severe vibrations, e.g. a fin, it is advantageous to stabilize the sighting line by a gyroscopic arrangement in a known manner.

What is claimed is:

1. Apparatus for electrooptical detection, location and tracking of a target, adapted to be mounted on an aircraft having a reference axis, comprising:

an orientatable device having a first member adapted for connection to said aircraft and movable in azimuth about said reference axis, and a second member connected to said first member and movable in elevation about an axis perpendicular to said reference axis;

a first lens system connected to said second member, for receiving radiation from a target and providing an image thereof;

catadioptric image offsetting means for maintaining orientation of said image with respect to said reference axis while said orientatable device moves in azimuth and/or elevation, said offsetting means including a first mirror integral with said second member for reflecting said radiation received from said first lens, and a second mirror integral with said first member for reflecting said reflected radiation in a direction substantially parallel to said reference axis, said first and second mirrors being disposed so that a focal point of said first lens system lies between mirrors;

a second lens system, positioned along said reference axis, for receiving the radiation reflected from said second mirror and focusing it on a given image plane;

detector means, adapted to be connected to said aircraft substantially at said image plane, for detecting radiation received from said second lens and providing signals corresponding thereto; and servo means for moving said first and second members in accordance with said signals to track said target.

2. Apparatus according to claim 1 wherein said offsetting means further includes third and fourth mirrors, and wherein said first mirror reflects radiation to said third mirror in a direction substantially parallel to said perpendicular axis, said radiation then being reflected from said third mirror to said fourth mirror and then to said second mirror.

3. Apparatus according to claim 2 wherein said third and fourth mirrors are mounted on said second member, and wherein said first lens system focal point lies between said third and fourth mirrors, and further including a field collecting lens positioned substantially at said focal point.

4. Apparatus according to claim 2 wherein said third and fourth mirrors are connected to and circularly driven by said first member, and wherein said first lens system focal point lies between said third and fourth mirrors, and further including a field collecting lens positioned substantially at said focal point.

5. Apparatus according to claim 1 wherein said second lens system includes a first lens connected to said first member so as to form an afocal lens system with said first lens system, and a second lens for focusing radiation from said first lens onto said imaging plane.

6. Apparatus according to claim 1 further including separator means, disposed between said second mirror and said detector means, for forming an additional optical channel.

7. Apparatus according to claim 6 wherein said second lens system includes a first lens connected to said first member so as to form an afocal lens system with said first lens system, and a second lens for focusing radiation from said first lens onto said imaging plane, and wherein said separator means includes a dichroic mirror positioned between said first and second lenses.

8. Apparatus according to claim 1 further including:
processing and angular deviation measurement and automatic tracking means, coupled between said detector means and said servo means, for converting detector means signals into servo command signals; and
display means, coupled to said processing means, for providing a display of detected targets.

9. Apparatus according to claim 8 further including laser telemetry means for providing target range information, said telemetry means including:
laser means for providing a laser beam;
optical deviating means for positioning said laser beam; and
laser servo means for adjusting said optical deviating means in accordance with said servo command signals.

10. Apparatus according to claim 9 wherein said optical deviating means includes a bidimensional mirror.

11. Apparatus according to claim 9 further including separator means, disposed between said second mirror and said detector means, for forming an additional optical channel for use by said laser beam.

12. Apparatus according to claim 1 further including laser telemetry means for providing target range information, said telemetry means including:
laser means for providing a laser beam;
optical deviating means for positioning said laser beam; and
laser servo means for adjusting said optical deviating means in accordance with said signals.

13. Apparatus according to claim 12 wherein said detector means includes a detecting strip, and further including a field scanning system positioned between said separator means and said strip.

14. Apparatus according to claim 13 wherein said second lens system includes a first lens connected to said first member so as to form an afocal lens system with said first lens system, and a second lens for focusing radiation from said first lens onto said imaging plane, and wherein said laser means includes detector means for detecting a laser beam reflected from said target and for providing signals corresponding to said target range, and further including focusing means for focusing said second lens in accordance with said target range signals.

15. Apparatus according to claim 1 wherein said first lens system is replaced by a Cassegrain device having a first reflector for receiving and reflecting said radiation from said target, and a second reflector for reflecting radiation reflected from said first reflector, and wherein said first mirror is located at a focal point of said Cassegrain device to receive radiation reflected from said second reflector.

16. Apparatus according to claim 1 wherein said servo means includes a circular drive motor, adapted to be connected to said aircraft, for driving said first member, and an elevation drive motor, connected to said first member, for driving said second member, and wherein said circular and said elevation drive motors each include angular sensor means for providing signals regarding the angular position of said first and second members.

17. Apparatus according to claim 1 wherein said orientable device is gyroscopically stabilized.

18. Apparatus according to claim 1 further including laser telemetry means for determining range to a target with a laser beam, and wherein said laser beam has a wavelength approximately equal to 1.06 to 10.6 microns, and said radiation is infra-red radiation having a wavelength approximately equal to 3 to 12 microns.

19. Apparatus according to claim 1 wherein said detector means includes a television picture sensor.

20. Apparatus according to claim 19 further including laser telemetry means for determining range to a target with a laser beam, and wherein said laser beam has a wavelength approximately equal to 1.06 to 10.6 microns, and said radiation is in the visible range.

* * * * *